Sept. 29, 1959  R. E. PLETKA  2,906,357
POWER DRIVING UNITS
Filed July 11, 1957  2 Sheets-Sheet 1
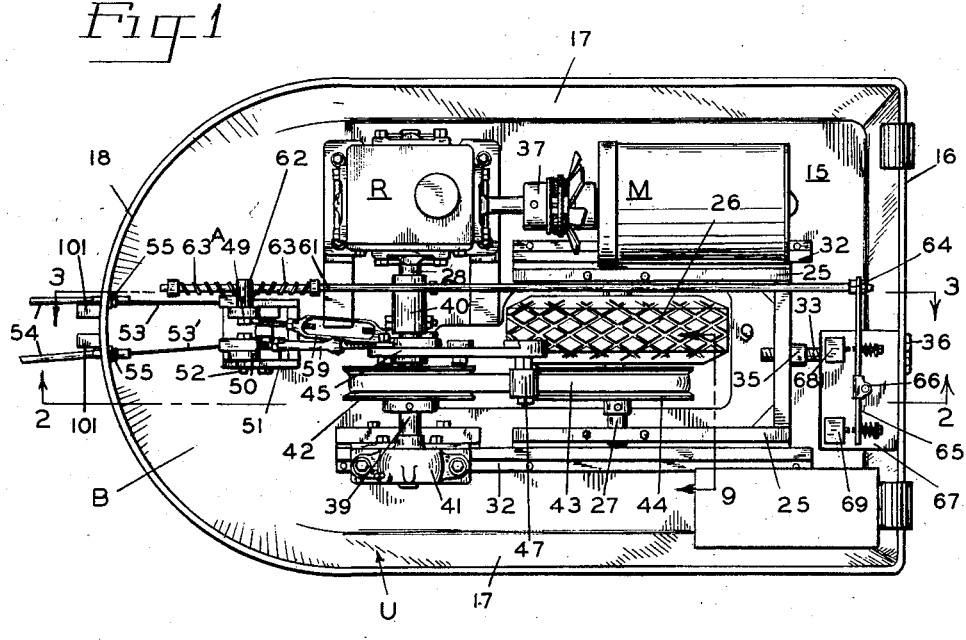
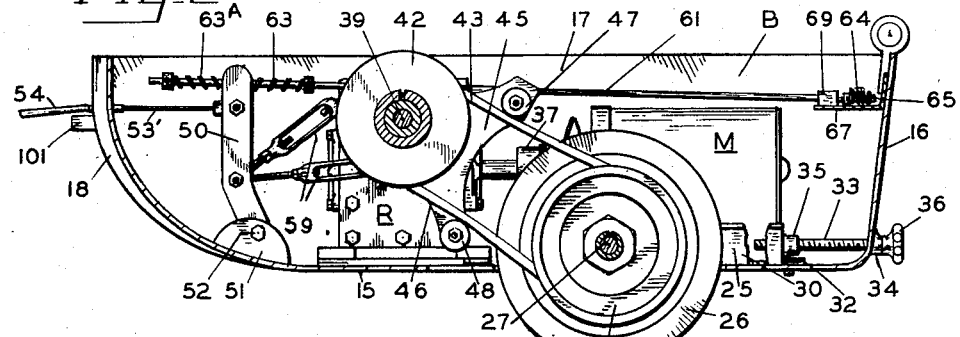
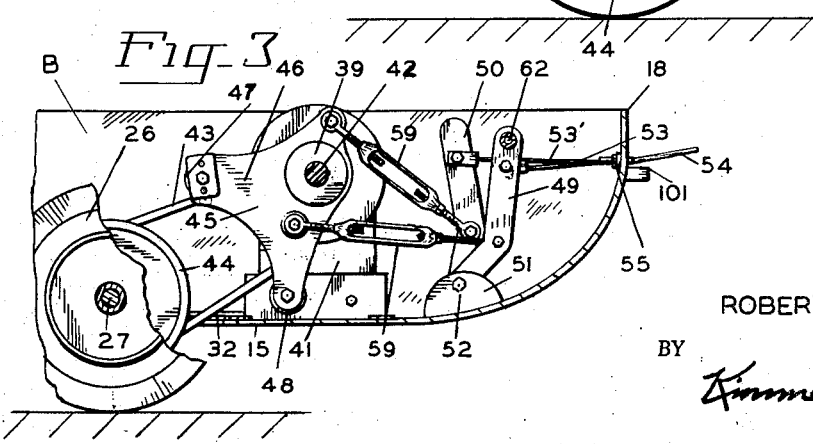
INVENTOR.
ROBERT E. PLETKA
BY
Kimmel & Crowell

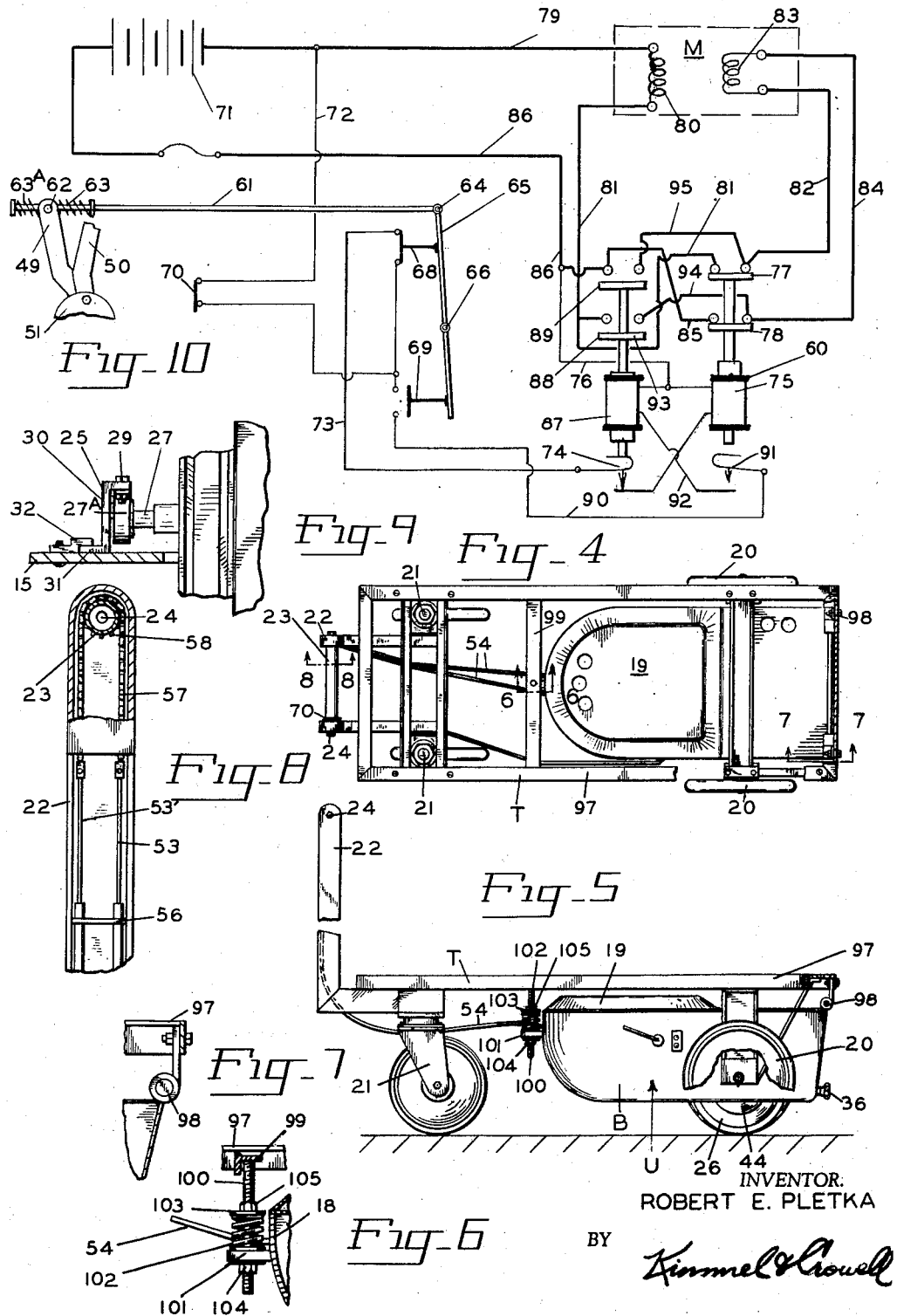

United States Patent Office 2,906,357
Patented Sept. 29, 1959

2,906,357

POWER DRIVING UNITS

Robert E. Pletka, Portland, Oreg.

Application July 11, 1957, Serial No. 671,350

3 Claims. (Cl. 180—15)

The present invention relates to power driving units which are particularly adapted for attachment to wheeled carts, trucks, wagons and the like, for moving them from place to place.

The primary object of the invention is to provide a power driving unit incorporated in a single compact unit, including a driving wheel driven by a portable power supply, such as a battery.

Another object of the invention is to provide a power driving unit for carts, trucks, wagons and the like that will serve both as a driving unit and as a braking unit.

A further object of the invention is to provide in a power driving unit means for starting and stopping a vehicle gradually, thus preventing jerks or jolts in the starting or stopping movement of the vehicle.

A still further object of the invention is to provide in a power driving unit means of raising the driving unit out of contact with the surface over which the vehicle is being moved in the event of mechanical failure of the unit so that the vehicle can be manually moved.

A still further object of the invention is to provide a driving unit than can be easily and readily attached or detached from a vehicle.

Other objects and advantages will become apparent from the following specification when considered in the light of the attached drawings, in which:

Figure 1 is a plan view of a power driving unit with the cover removed.

Figure 2 is a vertical sectional view, taken on line 2—2 of Figure 1, looking in the direction indicated.

Figure 3 is a vertical fragmentary sectional view, taken on line 3—3 of Figure 1, looking in the direction indicated.

Figure 4 is a plan view partially broken away and in section of a power driving unit attached to a 4-wheeled cart.

Figure 5 is a side elevation of the structure shown in Figure 4, parts broken away for convenience of illustration.

Figure 6 is an enlarged fragmentary sectional view, taken on line 6—6 of Figure 4, looking in the direction indicated.

Figure 7 is an enlarged fragmentary sectional view, taken on line 7—7 of Figure 4, looking in the direction indicated.

Figure 8 is an enlarged fragmentary sectional view taken on line 8—8 of Figure 4 looking in the direction indicated.

Figure 9 is an enlarged fragmentary sectional view, taken on line 9—9 of Figure 1, looking in the direction indicated.

Figure 10 is a wiring diagram of the electric circuit for controlling and driving the unit.

Referring now to the drawings in detail wherein like reference characters indicate like parts throughout the several figures, the reference character U indicates generally a power driving unit constructed in accordance with the invention.

The driving unit U includes a box-like body B, having a bottom 15, forward wall 16, side walls 17 and a rear wall 18. A cover 19 covers the working parts within the body B and is detachably secured to the body B by means (not shown).

While in Figures 4 and 5 power unit U is shown attached to a hand truck T, the use of the unit U is not limited to this particular design of truck T. The truck T is supported on wheels 20 at one end and on caster wheels 21 at its opposite ends. The truck T carries at its rear end upwardly extending standards 22, having a rotatable handle bar 23 journalled between their upper ends by a cross bolt 24.

The power unit U includes a U-shaped horizontal slidable frame 25 to which is mounted a driving wheel 26, fixedly keyed to an axle 27 journalled within bearings 27A fixedly secured to upper flanges 29 of legs 30 of the U-shaped frame 25. Power flanges 31 of the legs 30 operate under the clips 32 fixedly secured to the bottom 15 of the body B.

The U-shaped frame 25 is moved forward and backward by the action of a threaded screw 33 rotatably mounted within a bearing 34 carried on the front wall 16 of the unit U and threaded within a threaded boss 35 forming part of the U-shaped frame 25. The threaded screw 33 is revolved by a hand wheel 36.

A driving motor M, preferably of a low voltage type, operated by a storage battery, is mounted on the bottom 15 of the body B by suitable means (not shown). A speed reducer R is also mounted to the bottom 15 of the body B and is driven by the motor M through a coupling 37.

The shaft 28 of the speed reducer R is coupled to a countershaft 39 through a rigid coupling 40. The opposite end of the countershaft 39 is journalled within a supporting bearing 41 mounted on the base 15 of the body B. A belt sheave 42 is keyed to the countershaft 39 and drives the V-belt 43 which is also trained about the driven sheave 44 keyed to the axle 27 of the driving wheel 26. The belt 43 normally has sufficient slack to permit the driving sheave 42 to revolve freely therein until tightened by a clutch mechanism belt tightener 45 controlled by the operator.

The belt tightener 45 includes a spider 46 rotatably mounted on the countershaft 39, as best illustrated in Figures 1 and 3. Idler rollers 47 and 48 are journalled to the spider and embrace both runs of the belt 43, as best illustrated in Figure 2. The spider 46 is oscillated by movement of levers 49 and 50, the lower ends of which are journalled to a bracket 51 at 52. The movement of the levers 49 and 50 are controlled by flexible control wires 53 and 53', which operate within flexible conduits 54. One end of each of the conduits 54 are adjustably secured to the rear end 18 of the unit B at 55. The opposite ends of the conduits 54 are fixedly secured to the upstanding standards 22 at 56, referring particularly to Figure 8.

The control wires 53 and 53' are fixedly secured to a chain 57 trained about a sprocket 58 mounted on the handle bar 23. By rotating the handle bar 23 in either one direction or the other, the control wires 53 and 53' oscillate the spider 46 so as to cause either the roller 47 or roller 48 to contact the belt 43, tightening the same.

When the lever 49 is moved from its neutral position to the position shown in Figure 3, it will pull turnbuckle connection 59 between levers 49 and 50 and the spider 46 rocking the spider 46 and causing the idler roller 47 to engage the upper run of the belt 43, tightening the belt 43 so that when the motor M is started in one direction the driving wheel 26 will be revolved in a direction to move the truck T backward.

If the handle bar 23 were revolved in the opposite direction the lever 50 would be brought forward rocking the spider 46 in the opposite direction tightening the lower run of the belt 43, forcing the belt 43 tightly into the sheave 44 so that the motor M on being reversed will drive the driving wheel 26 in the direction to move the truck T forward.

A reversing switch 60, referring particularly to Figures 1, 2 and 10, is provided for controlling the motor M in either direction. Connected to the lever arm 49 is a push and pull rod 61 pivotally mounted to the pivot point 62 between a pair of take-up springs 63 and 63A. The rod 61 extends towards the front of the driving unit U, terminating at a pivot connection 64 by which it is connected to a switch operating bar 65.

The switch operating bar 65 is pivotally mounted at 66 to a bracket 67 mounted within the body B. This switch operating bar 65 actuates selectively either of the two switches 68 or 69, depending upon whether the operator wishes to go forward or backward with the truck T. Operation of the switch 68 is effective to move the truck backward when closed in the following manner. When hand switch 70 is closed and the handle bar 23 is rotated to pull the lever 49 to the position shown in Figure 3, electric energy will flow from the battery 71, through conductor 72, switch 70, through the switch 68, conductor 73, through the switch 74, solenoid 75 back to the battery through a conductor 76. This will close the reversing switch bars 77 and 78, which will conduct electric energy through the conductor 79, field coil 80, conductor 81, switch bar 77, conductor 82, through the armature winding 83 of the motor conductor 84, through the switch bars 78, conductor 85 back through the conductor 86 to the battery 71, driving the motor M in one direction.

The electric control switch 68 is closed by the action of the spring 63A slightly before the belt tightener 45 tightens the driving belt 43, as above described. This gives the motor M a chance to get started and as the handle bar 23 is further revolved, it pulls the control wire 53 and the lever 49 a sufficient distance to apply the proper tension on the belt 43. The spring 63A is such as to permit the lever 49 to over-ride after moving the switch operating bar 65 the required distance to close the switch 68. By this arrangement a smooth easy start is provided to the vehicle being propelled.

In the event it is desired to cause the cart T to be moved in the opposite direction, the handle bar 23 is revolved in the opposite direction, which will pull the lever 50 to apply the tightening roller 48 on the spider 46 against the lower run of the belt 43. At the same time the push rod 61 is forced in the opposite direction, causing the switch operating bar 65 to contact the switch 69 to energize the solenoid 87 and close switch bars 88 and 89, completing the following circuit.

Energy will be delivered from the battery 71 through the conductor 72, hand operated switch 70, switch 69, conductor 90, through a switch 91, conductor 92, solenoid 87 through the return conductor 76 to the battery 71. This will close the switch bars 88 and 89, energy will flow from the battery 71, conductor 79, through the field coil 80 of the motor conductor 81, through the contact bar 93, conductors 94, through conductor 84, through the armature winding 83, back through the conductor 82, conductor 95, switch bar 89 and back to the battery through the conductor 86, reversing the direction of the motor M.

The motor M is started as before slightly before the clutch mechanism 45 engages the belt 43 in driving position, the spring 63 being such as to permit the lever 49 to over-ride in applying the belt tightener 45 after the motor switch 60 has been operated. The switches 74 and 91 are provided for preventing the reversing switch 60 from operating in the opposite direction once the same has been energized for a definite direction of movement of the unit U, and this is known as an interlocking feature.

The driving unit U is mounted to any type cart T, truck, wagon or the like by pivotally mounting its forward end to a frame 97 of the truck T by a hinged connection 98. The rear end of the unit U is adjustably mounted under a cross member 99 of the frame 97 by an adjustable threaded rod 100. The rod 100 passes through an ear 101 forming part of the rear end 18 of the body B of the driving unit U.

A spring 102 is positioned to allow the rear end of the driving unit U to rise against a stop collar 103 in travelling over uneven surfaces. The driving wheel 26 can be raised from the surface so that the truck T can be hand operated by raising the ear 101 on the threaded stem 100 using adjusting nuts 104 and 105. It has been found that the driving wheel 26 should be transversely in line with the supporting wheels 20 of the truck T in order to operate properly.

The hand operated switch 70 is located in a position relative to the handle bar 23 so that the operator can readily maintain the same in closed position on operating the driving unit U, but on releasing the switch 70 by moving his hand away from the same, the driving unit U automatically comes to a stop because of the breaking of the electric circuit through the switch 70 to the reversing switch 60.

In the use and operation of the invention the operator places his hand against the switch 70, referring to Figures 4 and 10, then by turning the handle bar 23 in either direction he can cause the driving unit U to move the cart T in the desired direction. When he rotates the handle bar 23 the chain 57, referring to Figure 8, will selectively pull the operating wires 53 and 53' to move the levers 49 and 50 in the desired direction, at the same time the lever 49 will operate the pull rod 61 to close selectively the switch 68 or 69, operating the reversing switch 60 so as to drive the motor M in the desired direction.

After the motor M starts, further rotation of the handle bar 23 actuates the belt tightener 45 to tighten the belt 43 gradually, causing the driving wheel 26 to rotate in the desired direction to move the truck T forward or backward.

If it is desired to use the driving wheel 26 as a brake, the operator continues to hold the belt tightener 45 in position to hold the belt 43 in contact with the sheave 44 and by releasing his hand from the switch 70, the motor M will stop and act as a brake.

When it is desired to tighten the driving belt 43, the hand wheel 36 is rotated, pulling the U-shaped frame 25 along the guideclips 32 to the desired position to tighten the belt 43.

From the above description it can be readily seen that this driving unit U is self-contained and is easily adapted to any type of vehicle T wherein it is desired to move the same by power. I have not illustrated the position of the battery, since its position will depend upon the kind of truck being operated so long as it is located where it can conveniently be serviced.

Having thus described the preferred embodiments of the invention it should be understood that numerous structural modifications and adaptations may be resorted to without departing from the scope of the appended claims.

What is claimed is:

1. A power drive unit attachment for vehicles comprising a box, a ground engaging wheel journalled in said box and depending therefrom, means in said box longitudinally slidably supporting said wheel for longitudinal sliding adjustment thereof with respect to said box, means for detachably securing said box to a vehicle to be moved with said wheel in engagement with the ground, an electric motor in said box, hand controlled means for releasably connecting said wheel to said electric motor, a reverse switch for said electric motor to energize said electric motor for operation in opposite directions of rotation, and means connected to said reversing switch and said releasable connecting means for actuating said reversing switch in advance of actuating said releasable connecting means.

2. A device as claimed in claim 1 wherein said releasable connecting means includes a pair of aligned sheaves, a belt trained over said sheaves, and means for tightening said belt on said sheaves.

3. A device as claimed in claim 1 wherein the means for detachably securing said box to said vehicle includes a hinge having a horizontally extending transverse pivot securing the forward end of said box to the forward end of said vehicle, a threaded shaft depending from said vehicle adjacent the rear end of said box, an ear on said box engaging over said threaded shaft for vertical movement thereon, and vertically adjustable resilient means on said threaded shaft biasing said box away from said vehicle.

References Cited in the file of this patent

UNITED STATES PATENTS

| | | |
|---|---|---|
| 612,360 | Lindsay | Oct. 11, 1898 |
| 969,593 | Blalock | Sept. 6, 1910 |
| 1,388,449 | Brasseur | Aug. 23, 1921 |
| 1,887,433 | Ruhren | Nov. 8, 1932 |
| 2,478,327 | Schreck | Aug. 9, 1949 |
| 2,495,573 | Duke | Jan. 24, 1950 |
| 2,712,357 | Fulton et al. | July 5, 1955 |